United States Patent [19]

Gyoda et al.

[11] Patent Number: 4,722,552
[45] Date of Patent: Feb. 2, 1988

[54] APPARATUS FOR RETAINING INTERMEDIATE PORTION OF WEBBING

[75] Inventors: Toshio Gyoda; Mitsuaki Katsuno; Tatsushi Kubota; Chikao Nagasaka; Kazuyoshi Kato, all of Aichi, Japan

[73] Assignees: Kabushiki Kaisha Tokai-Rika-Denki Seisakusho; Toyota Jidosha Kabushiki Kaisha, both of Japan

[21] Appl. No.: 871,864

[22] Filed: Jun. 9, 1986

[30] Foreign Application Priority Data

Jun. 12, 1985 [JP] Japan .................................. 60-88487
Oct. 2, 1985 [JP] Japan ................................ 60-151408
Oct. 2, 1985 [JP] Japan ................................ 60-151409

[51] Int. Cl.$^4$ ............................................. B60R 21/10
[52] U.S. Cl. ................................................... 280/802
[58] Field of Search ........................ 280/801, 802, 807

[56] References Cited

U.S. PATENT DOCUMENTS 3,219,361 11/1965 Brown ................................. 280/801
3,743,319 7/1973 Winchell ............................. 280/807
4,262,932 4/1981 Motonami et al. ................. 280/802

FOREIGN PATENT DOCUMENTS 2252356 5/1973 Fed. Rep. of Germany ...... 280/802
63933 5/1980 Japan .................................. 280/802

Primary Examiner—John J. Love
Assistant Examiner—Ross Weaver
Attorney, Agent, or Firm—Sixbey, Friedman & Leedom

[57] ABSTRACT

A webbing intermediate portion retaining apparatus for use in an automatic seatbelt system for a vehicle arranged such that, when an occupant enters the vehicle, an occupant restraining webbing is automatically fastened to the occupant's body, whereas, when the occupant leaves the vehicle, the webbing is automatically unfastened from his body. The apparatus enables the intermediate portion of the webbing to be retained by a hook provided on a door of the vehicle when the occupant leaves the vehicle. The apparatus effects control such that, when the occupant is going to leave the vehicle, the hook is moved to a position for retaining the intermediate portion of the webbing, whereas, after the occupant has entered the vehicle, the hook is moved to a position for canceling the retaining of the intermediate portion of the webbing. Accordingly, when the occupant enters and leaves the vehicle, it is possible to ensure a sufficient space for him to move smoothly.

23 Claims, 14 Drawing Figures

FIG-13

| Switch | Rotation Position Of Hook | Retaining Position | Retaining → Retaining Canceling Position | ← Retaining Position |
|---|---|---|---|---|
| Door Closed | ON: Closed OFF: Open | | | |
| Seat Switch | ON: Seating OFF: Leave Seat | | | |
| Retractor Switch | ON: Unwind Webbing OFF: Webbing Fastened Condition | | | |
| Transmission Switch | ON: N or P OFF: Other Than N and P | | | |
| Hand Brake Switch | ON: Release OFF: Lock | | | |

APPARATUS FOR RETAINING INTERMEDIATE PORTION OF WEBBING

BACKGROUND OF THE INVENTION

1. Field of the Invention

The present invention relates to an apparatus for retaining the intermediate portion of an occupant restraining webbing of a seatbelt system for a vehicle designed to protect an occupant in an emergency situation of the vehicle, so as to ensure a sufficient space for the occupant to enter and leave the vehicle smoothly.

2. Description of the Related Art

One type of automatic seatbelt system has heretofore been proposed in which one end of a webbing is secured to a door of a vehicle such that the webbing is automatically fastened to the body of an occupant in response to the closing motion of the door. In this type of seatbelt system, when the occupant closes the door after seating himself in the seat, the intermediate portion of the webbing is moved toward the rear end of the vehicle in response to the closing circular motion of the door, and the webbing is therefore automatically fastened to the body of the occupant seated in the seat. When the door is opened, the intermediate portion of the webbing is moved toward the front end of the vehicle in response to the opening circular motion of the door, and the webbing is therefore separated from the occupant's body, thus providing a space between the webbing and the seat which allows the occupant to enter and leave the vehicle smoothly.

In one arrangement of such automatic seatbelt system, a hook is provided near the front end of the door for retaining the intermediate portion of the webbing so that it is possible to ensure a sufficient space for the occupant to enter and leave the vehicle smoothly irrespective of the angle of opening of the door. This arrangement suffers, however, from the inconvenience in use that, for instance, when the occupant leaves the vehicle, he needs to actuate the hook by hand so that it can retain the intermediate portion of the webbing.

There is another type of conventional webbing intermediate portion retaining apparatus in which, as shown in FIG. 14, a hanger 2 is provided on the intermediate portion of a webbing 1, and an engagement opening 3 provided in the hanger 2 is engaged with a projection 5 of a hook 4 which is secured near the front end of the door. In this apparatus, however, the projection 5 for retaining the hanger 2 must be designed so as not to accidentally catch the occupant's clothes or the like. In addition a range X within which the hanger 2 can be hooked over the hook 4 is relatively narrow, and this limits the operation of hooking the hanger 2 and requires a relatively large turning force when the hanger 2 is disengaged from the hook 4.

SUMMARY OF THE INVENTION

In view of the above-described circumstances, it is a primary object of the present invention to provide a webbing intermediate portion retaining apparatus which enables the hook to be automatically actuated so that it can retain the intermediate portion of the webbing when the occupant leaves the vehicle without the need for him to actuate the hook by hand.

To this end, the present invention provides a webbing intermediate portion retaining apparatus which comprises: a hook provided on a door and capable of retaining the intermediate protion of a webbing; drive means for selectively moving the hook to a webbing intermediate portion retaining position and a webbing retaining canceling position; detector means for detecting the fact that an occupant is going to leave the vehicle and the fact that the occupant has already entered the vehicle; and control means for controlling the drive means in response to a signal from the detector means such that, when the occupant is going to leave the vehicle, the hook is moved to the webbing intermediate portion retaining position, whereas, after the occupant has entered the vehicle, the hook is moved to the webbing retaining canceling position.

Accordingly, the present invention enables the intermediate portion of the webbing to be readily retained by the hook when the occupant is going to leave the vehicle, and after the occupant has entered the vehicle, the retaining of the webbing is automatically canceled. Thus, it is possible to ensure a sufficient space for the occupant to enter and leave the vehicle smoothly, and there is no fear of the webbing contacting the occupant's body and making the occupant feel unpleasant when he enters and leaves the vehicle.

BRIEF DESCRIPTION OF THE DRAWINGS

FIG. 13 is a time chart corresponding to Steps 200 to 230 shown in FIG. 12; and

DESCRIPTION OF THE PREFERRED EMBODIMENTS

The present invention will be described hereinunder in detail with reference to the accompanying drawings.

Figure 1:
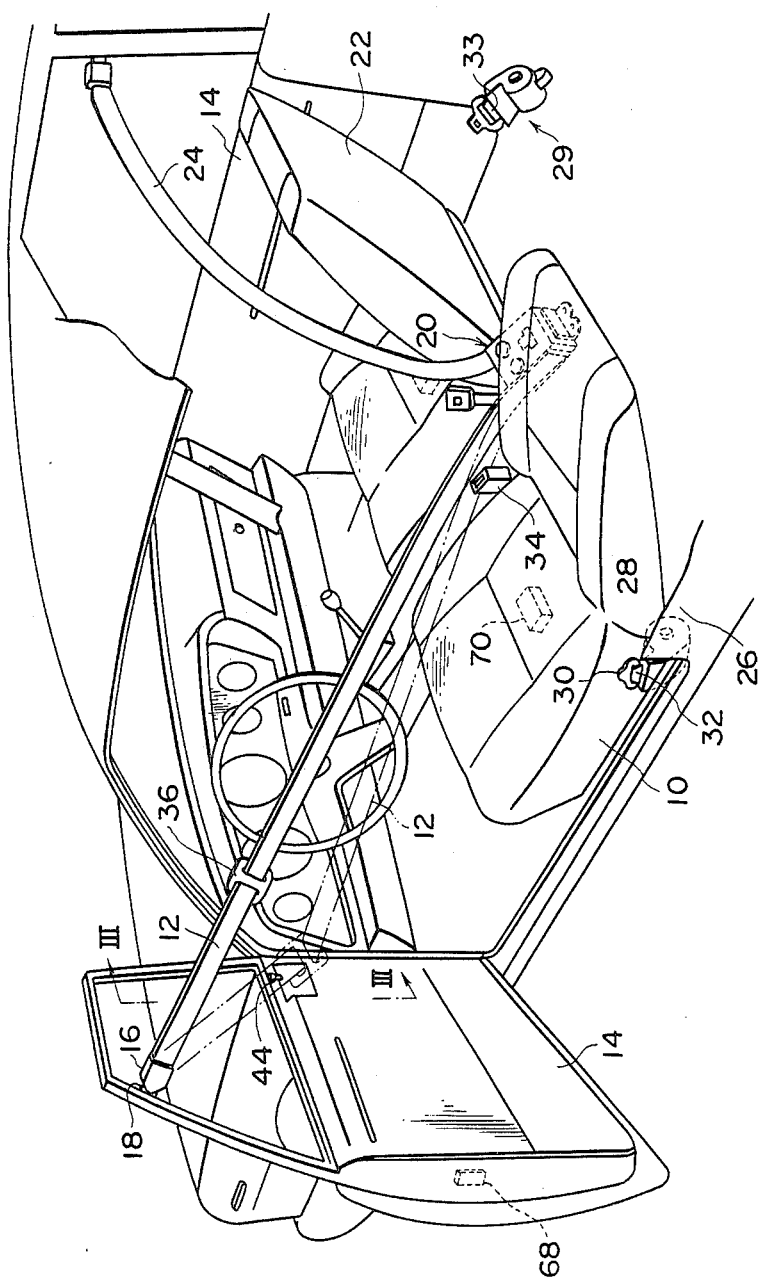
FIG. 1 is a perspective view showing a first embodiment of the webbing intermediate portion retaining apparatus according to the present invention.

FIG. 1 is a perspective view of a seatbelt system to which a first embodiment of the webbing intermediate portion retaining apparatus according to the present invention is applied.

In this seatbelt system, an occupant seating himself in a driver's seat 10 on the left-hand side of the vehicle can fasten a webbing 12 as a shoulder webbing. One end of the webbing 12 is supported at the upper side of the rear end of a door 14 through a combination of a buckle device 16 and a tongue plate 18 which is engaged therewith, and the other end of the webbing 12 is wound up under biasing force into a retractor 20 mounted on an approximately central portion of the vehicle.

The retractor 20 is adapted to wind up the webbing 12 by means of biasing force, and incorporates an inertia type lock mechanism for instantaneously stopping the webbing 12 from being unwound when an emergency situation of the vehicle occurs.

Another webbing 24 is provided for a seat 22 on the right-hand side of the vehicle. The arrangement of this webbing 24 is similar to that of the webbing 12. Namely, one end of the webbing 24 is wound up into the retractor 20 in parallel to the webbing 12.

A retractor 28 is mounted on the indoor side of a side wall 26 of the vehicle for winding up thereinto a webbing 32 having a tongue plate 30 attached to the distal end thereof. This tongue plate 30 is engageable with a buckle device 34 which is disposed near the retractor 20, so that the occupant seated in the seat 10 can fasten the webbing 32 as a lap webbing by a manual operation. A retractor 29 which has the same arrangement as that of the retractor 28 is similarly provided for the seat 22 for winding up a webbing 33 thereinto.

Figure 2:
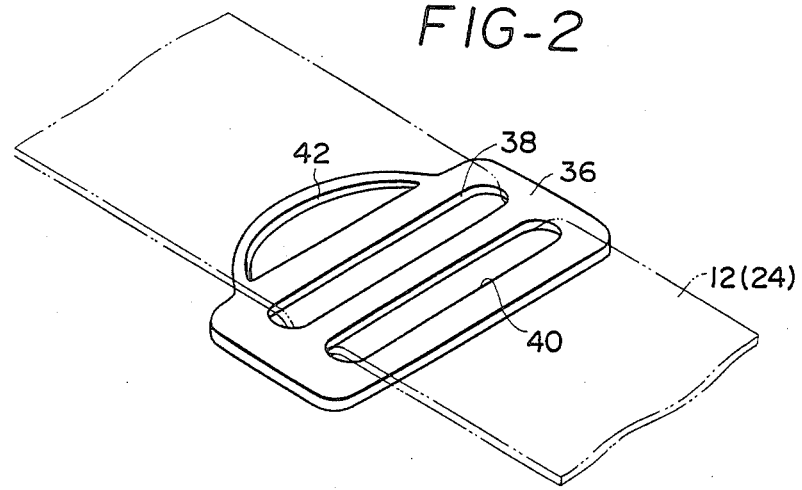
FIG. 2 is an enlarged view of a hanger provided on the intermediate portion of a webbing.

As shown in FIG. 2, a hanger 36 is provided on the intermediate portion of each of the webbings 12 and 24. The hanger 36 is made from a plate material which has a pair of slots 38 and 40 formed in the center thereof. The webbing 12 (24) is passed through these slots 38 and 40 in such a manner that the webbing is movable in its longitudinal direction. An engagement opening 42 is formed in one end portion of the hanger 36 so that the hanger 36 can be retained through the opening 42 by a hook 44 which projects from the door 14.

Figure 3:
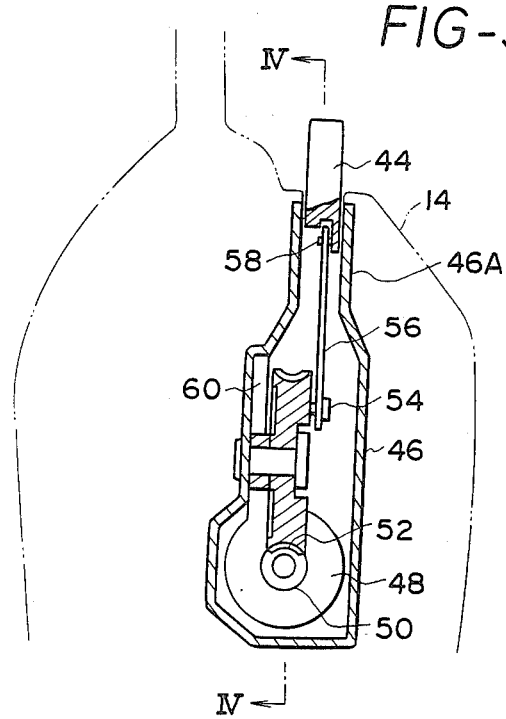
FIG. 3 is a sectional view taken along the line III—III in FIG. 1, showing a hook and its associated elements, which are provided inside a door.
Figure 4:
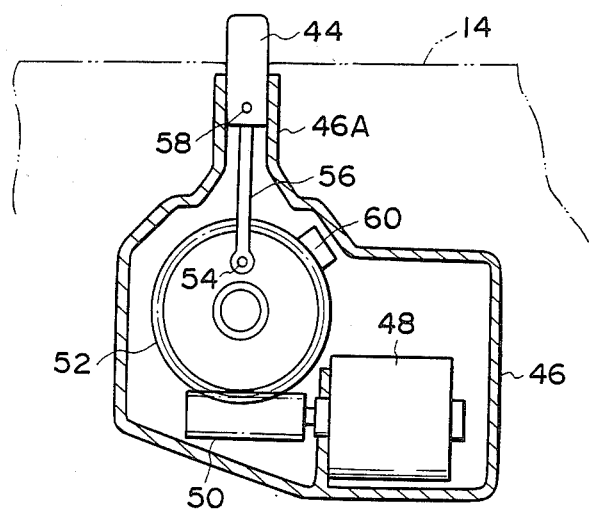
FIG. 4 is a sectional view taken along the line IV—IV in FIG. 3.

Referring next to FIGS. 3 and 4, the hook 44 is adapted to slide up and down within the neck portion 46A of a casing 46 which is accommodated inside the door 14 so that the hook 44 can emerge from and withdraw into the upper end portion of the door 14.

A motor 48 is provided inside the casing 46. The output shaft of the motor 48 is formed so as to define a worm 50. A worm wheel 52 is in engagement with the worm 50 such that the worm wheel 52 is rotatable 180° in both forward and backward directions in response to the rotation of the motor 48. One end of a link 56 is pivotally supported through a pin 54 at one portion of the worm wheel 52. The other end of the link 56 is pivotally attached to the hook 44 through a pin 58.

Thus, when the motor 48 rotates in the forward and backward directions, the hook 44 can project from and withdraw into the door 14, respectively. The worm wheel 52 is provided with a rotational angle sensor 60 which is attached to the casing 46. The sensor 60 is adapted to detect a direction of rotation of the worm wheel 52 and a position in which the worm wheel 52 has rotated ½ of a full turn, and deliver the detection signal to a microcomputer 62 shown in FIG. 5. The microcomputer 62, in response to the input signal, suspends the drive of the motor 48 through a drive means 64.

Figure 5:
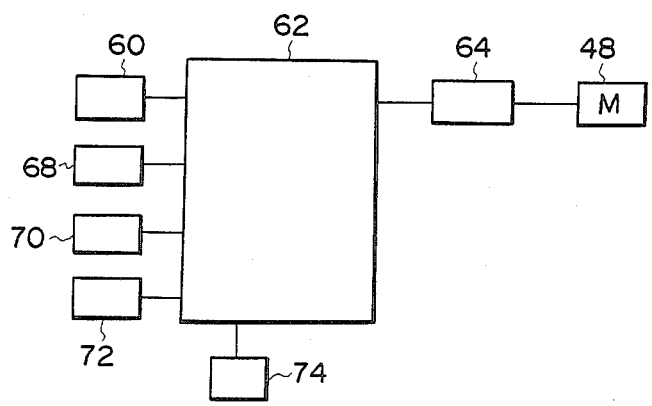
FIG. 5 is a circuit diagram showing a microcomputer and its associated elements, which are employed to control the first embodiment.

In addition, various switches are mounted on the vehicle for the purpose of detecting whether an occupant is going to leave or has entered the vehicle: namely, a door switch 68 for detecting whether the door 14 is open or closed; seat switches 70 respectively incorporated in the seats 10 and 22 for detecting the fact that occupants are seated in the seats 10 and 22; and vehicle speed sensor 74 for detecting whether the vehicle is moving or at rest. These devices are connected to the microcomputer 62 as shown in FIG. 5 so as to transmit various detection signals to the latter.

The following is a description of the operation of this embodiment arranged as detailed above.

When the occupant opens the door 14 in order to enter the vehicle, the webbing 12 extends as shown by the imaginary line in FIG. 1, since the hanger 36 has already been retained by the hook 44 which was caused to project when the occupant left the vehicle last, whereby it is possible to provide a space sufficient for the occupant to enter the vehicle smoothly.

When the occupant closes the door 14 after seating himself in the seat 10, the microcomputer 62 detects this fact through signals delivered from the door switch 68 and the seat switch 70 and rotates the motor 48 backwards, thus causing the hook 44 to withdraw into the door 14. In consequence, the hanger 36 is disengaged from the hook 44, and the webbing 12 is allowed to be wound up into the retractor 20 by means of biasing force, whereby the webbing 12 can automatically be fastened to the occupant's body.

When a predetermined period of time set on a timer has elapsed after the reception of the signal from the door switch 68, the microcomputer 62 actuates the motor to rotate forwards in order to make the hook 44 project from the door 14. Accordingly, even when the occupant leaves the vehicle immediately after he has entered the vehicle, he can hook the hanger 36 on the hook 44 before opening the door 14.

However, when the vehicle starts running after the hook 44 has projected from the door 14 in response to the operation of the timer, the microcomputer 62 actuates the motor 48 to rotate backwards in response to a signal from the vehicle speed sensor 74, thus causing the hook 44 to withdraw into the door 14. Accordingly, the hook 44 does not project from the door 14 during the running of the vehicle. The arrangement may be such that a signal from a switch for detecting the operation of a parking brake or the like, or a signal from an ignition switch is employed in place of or in addition to a signal from the vehicle speed sensor 74 so as to enable discrimination between a stop of running of the vehicle for waiting for a change of traffic signals and a stop for occupant's leaving the vehicle.

When the occupant stops the vehicle in order to leave the vehicle, the microcomputer 62 detects this fact from a signal from the vehicle speed sensor 74 and actuates the motor 48 so as to project the hook 44 from the door 14 again. Accordingly, the occupant can hook the hanger 36 on the hook 44 so that the intermediate portion of the webbing 12 is retained by the hook 44, whereby it is possible to obtain a sufficient space for the occupant to leave the vehicle smoothly. Since the microcomputer 62 does not drive the motor 48 while the microcomputer 62 is being supplied with a signal from the vehicle speed sensor 74 which represents the fact that the vehicle is in a running state, the hook 44 is not projected even when the occupant opens the door 14 during the running of the vehicle.

When the occupant closes the door 14 after leaving the vehicle, the microcomputer 62 detects this fact from signals from the door switch 68 and the seat switch 70, respectively, and allows the hook 44 to remain projecting from the door 14, thereby keeping the hanger 36 in engagement with the hook 44.

Accordingly, when the occupant opens the door 14 in order to enter the vehicle next time, it is possible to obtain a sufficient space for him to enter the vehicle smoothly.

It should be noted that, although the above-described embodiment employs a motor for causing the hook 44 to project and withdraw, other drive means such as a solenoid may be employed. In addition, it is not always necessary to arrange the hook 44 such that it is completely withdrawn into the door 14, and it is only necessary for the hook 44 to withdraw to such an extent that the hanger 36 can be disengaged therefrom. Therefore, the distal end of the hook 44 may somewhat project from the door 14.

Further, the arrangement may be such that the hook 44 projects and withdraws in response to the opening and closing motions, respectively, of the door 14. Alternatively, the hook 44 may be adapted to move up and down by a manual operation. In such case, a switch for manual operation may be provided.

As has been described above, according to the present invention, when the occupant leaves the vehicle, the hook is projected from the door, whereas, when the webbing is automatically fastened to the occupant's body, the hook is withdrawn into the door. It is therefore possible to retain the intermediate portion of the webbing by projecting the hook from the door only when necessary.

A second embodiment of the present invention will be explained below with reference to FIGS. 6 to 13. In these figures, the same members, elements or devices as those in the first embodiment are denoted by the same reference numerals.

Figure 6:
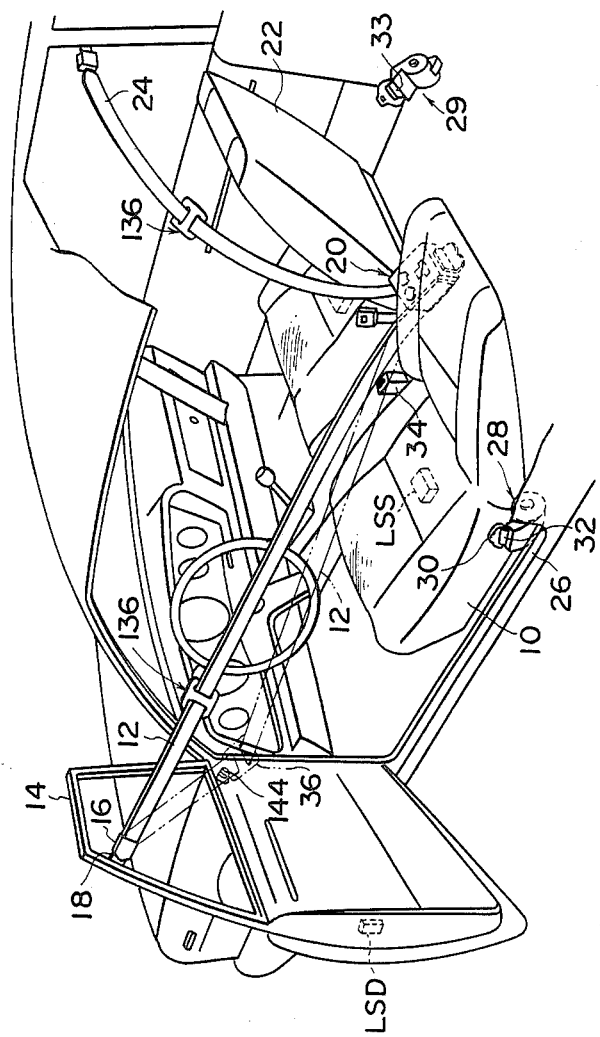
FIG. 6 is a perspective view showing a second embodiment of the webbing intermediate portion retaining apparatus according to the present invention.

Referring first to FIG. 6, an occupant seating himself in a driver's seat 10 on the left-hand side of the vehicle can fasten a webbing 12 as a shoulder webbing. One end of the webbing 12 is supported at the upper side of the rear end of a door 14 through a combination of a buckle device 16 and a tongue plate 18 which is engaged therewith, and the other end of the webbing 12 is wound up under biasing force into a retractor 20 mounted on an approximately central portion of the vehicle.

The retractor 20 is adapted to wind up the webbing 12 by means of biasing force, and incorporates an inertia type lock mechanism for instantaneously stopping the webbing 12 from being unwound when an emergency situation of the vehicle occurs.

Another webbing 24 is provided for a seat 22 on the right-hand side of the vehicle. The arrangement of this webbing is similar to that of the webbing 12. Namely, one end of the webbing 24 is wound up into the retractor 20 in parallel to the webbing 12.

A retractor 28 is mounted on the indoor side of a side wall 26 of the vehicle for winding up thereinto a webbing 32 having a tongue plate 30 attached to the distal end thereof. This tongue plate 30 is engageable with a buckle device 34 which is disposed near the retractor 20, and the occupant seated in the seat 10 can fasten the webbing 32 as a lap webbing by a manual operation. A retractor 29 which has the same arrangement as that of the retractor 28 is similarly provided for the seat 22 for winding up a webbing 33 thereinto.

Figure 9:
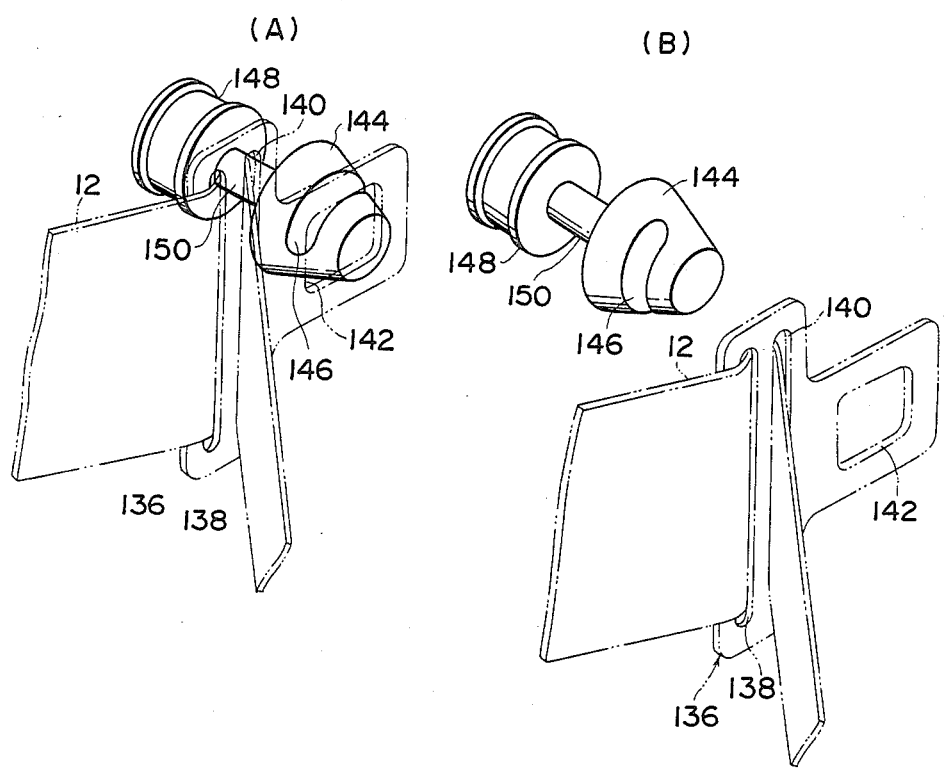
FIG. 9(A) is a perspective view showing the hook in a retaining position.
FIG. 9(B) is a perspective view showing the hook in a retaining canceling position.

As also shown in FIG. 9, a hanger 136 is provided on the intermediate portion of each of the webbing 12 and 24. The hanger 136 is made from a plate material which has a pair of slots 138 and 140 formed in the center thereof. The webbing 12 (24) is passed through these slots 138 and 140 in such a manner that the webbing is movable in its longitudinal direction. An engagement opening 142 is formed in one end portion of the hanger 136 so that the hanger 136 is retained through the opening 142 by a hook 144 which projects from the door 14.

Figure 7:
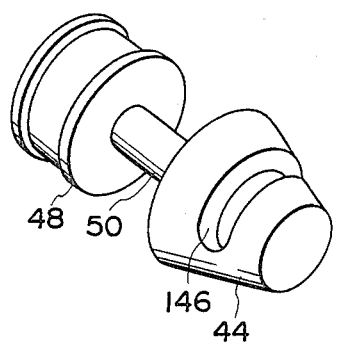
FIG. 7 is a perspective view of a hook secured to the rotary shaft of a rotary solenoid.
Figure 8:
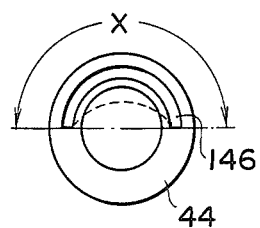
FIG. 8 is a front view of the hook, which shows a range within which a hanger can be hooked over the hook.
Figure 14:
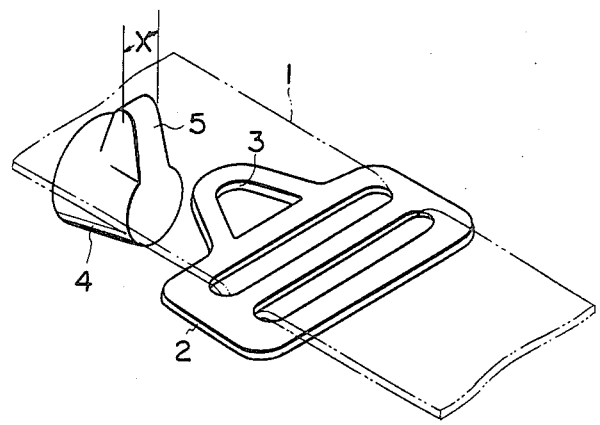
FIG. 14 is a perspective view of a prior art.

Referring now to FIG. 7, the hook 144 has a frusto-conical shape. A retaining groove 146 having a U-shaped cross-section is circumferentially formed in the peripheral surface of the hook 144. As shown in FIG. 8, the groove 146 extends half round the hook 144, so that a range X within which the hanger 136 can be hooked over the groove 146 is wider than that in the prior art shown in FIG. 14. The distal end of a rotary shaft 150 of a rotary solenoid 148 is secured to the center of the bottom surface of the hook 144 so that the hook 144 can be selectively turned to a retaining position and a retaining canceling position. It is a matter of course that a motor may be employed in place of the rotary solenoid 148.

Referring to FIG. 9(A) which shows the hook 144 in the retaining position, the edge of the engagement opening 142 is loosely fitted in the retaining groove 146 of the hook 144, and the hanger 136 is thereby retained by the hook 144. Since the hook 144 is frusto-conical, the engagement opening 142 can readily be fitted on the hook 144, and the hooking of the hanger 136 on the hook 144 is facilitated. Since no projection is provided on the hook 144, the engagement opening 142 can readily be fitted on the hook 144 regardless of the angle of rotation of the hanger 136 with respect to the hook 144.

When the hook 144 is rotated approximately 90° counterclockwise by actuating the rotary solenoid 148, the hook 144 is brought to the retaining canceling position as shown in FIG. 9(B). In consequence, the edge of the engagement opening 142 comes out of the retaining groove 146, thus causing the hanger 136 to disengage from the hook 144. Since the hook 144 has a frusto-conical shape, the hanger 136 is readily disengaged from the hook 144 by means of the component of the webbing tension acting on the hanger 136 in the direction of generating line of the hook 144. Thus, the occupant is brought into a webbing fastened condition.

Figure 10:
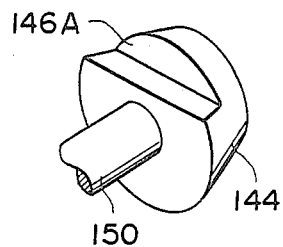
FIG. 10 is a perspective view of another example of the hook.

The groove 146 which serves as a retaining portion may be formed by partially cutting the peripheral and bottom surfaces of the hook 144, such as a retaining notch 146A shown in FIG. 10.

Although the hook 144 in this embodiment is designed to be rotated, this type of hook is not necessarily limitative, and it is, as a matter of course, possible to employ another type of hook which is arranged to project from and withdraw into the door such as that in the first embodiment.

A control circuit for the second embodiment will be explained below with reference to FIG. 11.

A door switch LSD is a limit switch which is closed when the door is opened and which is opened when the door is closed. A seat switch LSS is a limit switch which is opened when the occupant is seated in the seat 10 and which is closed when no occupant is seated in the seat 10 (see FIG. 13). Contact signals from the door switch LSD and the seat switch LSS are supplied to an AND gate 170. When both the door switch LSD and the seat switch LSS are opened, an RS flip-flop 174 is set through the AND gate 170 and an OR gate 172. In consequence, the Q output of the RS flip-flop 174 is raised to a high level to excite the rotary solenoid 148 through a driver 176, thereby turning the hook 144 to the retaining canceling position.

Accordingly, when the occupant opens the door 14 (LSD is closed), seats himself in the seat 10 (LSS is opened) and then closes the door 14 (LSD is opened), the hanger 136 is disengaged from the hook 144, and the occupant is brought into a webbing fastened condition.

An ignition switch IGSW is opened when the ignition device is OFF, and is closed when the ignition device is ON. A retractor switch LSR is a limit switch which is closed when the door is closed and the occupant has the webbing 12 fastened and which is opened when the occupant in this state unwinds the webbing 12 a little in order to hook the hanger 136 on the hook 144, that is, when the amount by which the webbing 12 is unwound exceeds a predetermined value. The contact signal from the ignition switch LGSW is supplied to an AND gate 180 through an OR gate 178. The contact signal from the retractor switch LSR is also supplied to the AND gate 180.

Accordingly, when the occupant unwinds the webbing 12 in order to hook the hanger 136 on the hook 144 when the ignition switch LGSW is OFF, a reset signal is supplied from the AND gate 180 to the RS flip-flop 174. In consequence, the Q output of the RS flip-flop 174 comes to a low level, so that the hook 144 is turned to the retaining position by the action of the rotary solenoid 148. Thus, the hanger 136 can be hooked on the hook 144.

A neutral position detecting switch LSN is a limit switch which is opened when the transmission is in the neutral position (N) and which is closed when the transmission is in any of the other positions. A parking position detecting switch LSP is a limit switch which is opened when the transmission is in the parking position (P) and which is closed when the transmission is in any of the other positions. In addition, a hand brake switch LSB is a limit switch which is opened when the hand brake is operative and which is closed when the hand brake is released. The neutral position detecting switch LSN and the parking position detecting switch LSP are connected in series, and the contact signal therefrom is supplied to an AND gate 182. The contact signal from the hand brake switch LSB is also supplied to the AND gate 182.

Accordingly, when the transmission is in either the neutral or parking position and the hand brake is operative, the output of the AND gate 182 is raised to the high level, and the AND gate 180 is thereby opened through the OR gate 178. In such case, even when the ignition switch IGSW is ON, if the webbing 12 is unwound, the retractor switch LSR is opened to reset the RS flip-flop 174, so that the hook 144 is turned to the retaining position, thereby allowing the hanger 136 to be hooked on the hook 144.

A NOR gate 184 is supplied with the contact signal from the ignition switch IGSW, the contact signal from the series circuit of the neutral position detecting switch LSN and the parking position detecting switch LSP, and the contact signal from the hand brake switch LSB.

Accordingly, when the ignition switch IGSW is turned ON and the hand brake is released and, further, the transmission is set in any position other than the neutral and parking positions, the output of the NOR gate 184 is raised to the high level, and the RS flip-flop 174 is thereby set through the OR gate 172. Therefore, even when the occupant seated in the seat 10 leaves the hanger 136 hooked on the hook 144, if the vehicle is started to run, the Q output of the RS flip-flop 174 is raised to the high level, so that the hanger 136 is disengaged from the hook 144, and the occupant is brought into a webbing fastened condition.

The operation of this embodiment, arranged as detailed above, will be explained below with reference to the flowchart shown in FIG. 12 and the time chart shown in FIG. 13.

Figure 12:
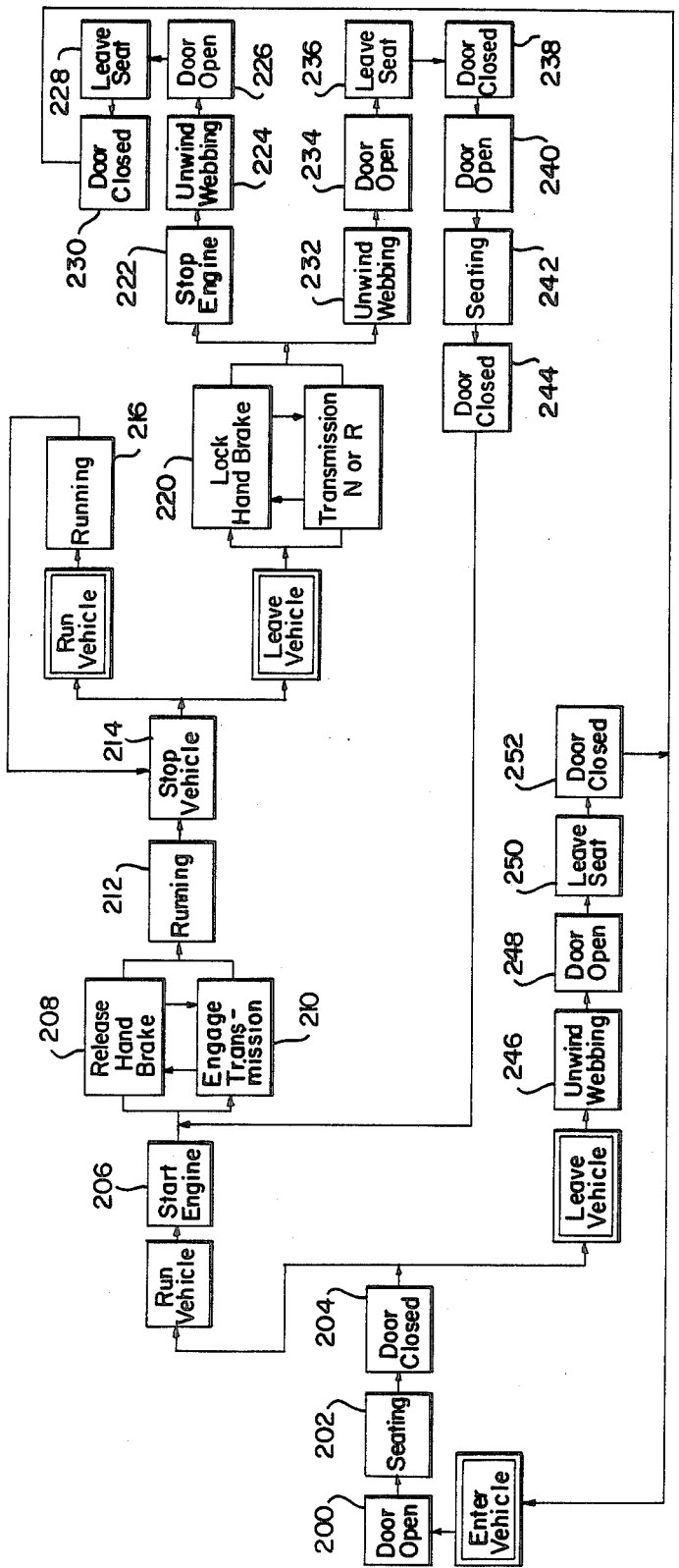
FIG. 12 is a flowchart showing the control of the second embodiment.

The time chart shown in FIG. 13 corresponds to Steps 200 to 230 shown in FIG. 12. It should be noted that the transmission switch shown in FIG. 13 means both the neutral position detecting switch LSN and the parking position detecting switch LSP.

It is assumed that, in their initial positions, the ignition switch IGSW is OFF; the transmission is in either the neutral or parking position; the hand brake is in an operative state; the door 14 is closed; the occupant is not seated in the seat 10; and the hanger 136 is hooked on the hook 144.

When, in this state, the occupant opens the door 14 and closes it after seating himself in the seat 10 (Steps 200 to 204), both the door switch LSD and the seat switch LSS are opened, and the RS flip-flop 174 is set through the AND gate 170 and the OR gate 172. In consequence, the hook 144 is turned to the retaining canceling position to cause the hanger 136 to be disengaged from the hook 144, thus bringing the occupant in a webbing fastened condition. Then, the occupant starts the engine, releases the hand brake and engages the gears in the transmission to run the vehicle (Steps 206 to 212). In this state, the ignition switch IGSW is closed, and the neutral position detecting switch LSN, the parking position detecting switch LSP and the hand brake switch LSB are also closed. The output of the OR gate 178 is therefore at the low level. For this reason, even when the webbing 12 is unwound to open the retractor switch LSR, the output of the AND gate 180 remains low, and the hook 144 is not turned to the retaining position. It is therefore impossible to hook the hanger 136 on the hook 144. Accordingly, during the running of the vehicle, the occupant is maintained in the webbing fastened condition, whereby the occupant's safety in an emergency situation of the vehicle is ensured. Even when the vehicle stops (Step 214) and the vehicle speed is consequently 0, the ignition switch IGSW is closed, and all the neutral position detecting switch LSN, the parking position detecting switch LSP and the hand brake switch LSB are closed similarly to the above. Therefore, even when the webbing 12 is unwound in this state, it is impossible to hook the hanger 136 on the hook 144. The same is the case with a driving operation in which the vehicle is repeatedly run and stopped (Steps 214 and 216).

When the transmission is shifted to either the neutral position or the parking position and the hand brake is locked and, further, the engine is stopped (Steps 218 to 222), the ignition switch IGSW is opened, and the AND gate 180 is therefore opened. Consequently, when the occupant unwinds the webbing 12 in order to hook the hanger 136 on the hook 144, the retractor switch LSR is opened, and the RS flip-flop 174 is thereby reset to actuate the rotary solenoid 148 to turn the hook 144 to the retaining position. Thus, it is possible for the occupant to hook the hanger 136 on the hook 144 so that the intermediate portion of the webbing 12 is retained by the hook 144.

Accordingly, the space between the webbing 12 and the seat 10 is widened to allow the occupant to leave the vehicle smoothly. Then, the occupant opens the door 14 (LSD is closed), leaves the seat 10 (LSS is closed) and closes the door 14 (Steps 226 to 230). At this time, the output of the AND gate 170 is at the low level, and the hanger 136 is left hooked on the hook 144.

When the engine is not stopped after the hand brake has been locked and the transmission has been changed over to the neutral or parking position in Steps 220 and 218, the neutral position detecting switch LSN or the parking position detecting switch LSP and the hand brake switch LSB are opened although the ignition switch IGSW is closed. Therefore, the output of the AND gate 182 is raised to the high level, and the AND gate 180 is opened. In consequence, the RS flip-flop 174 can be reset by unwinding the webbing 12 and thereby opening the retractor switch LSR, and it becomes possible to hook the hanger 136 on the hook 144. Then, the occupant opens the door 14, leaves the seat 10 and closes the door 14, and after parking, the occupant opens the door 14 again, seats himself in the seat 10 and closes the door 14 (Steps 234 to 244). The process then returns to Step 208 to repeat the above-described processing.

When the occupant unwinds the webbing 12 (Step 246) in order to leave the vehicle after he has once entered the vehicle (Steps 200 to 204), since the ignition switch IGSW is opened, the output of the OR gate 178 is raised to the high level, and the AND gate 180 is opened. Since the retractor switch LSR is opened, the RS flip-flop 174 is reset, and it becomes possible to hook the hanger 136 on the hook 144. For example, when the occupant has left a thing in the vehicle, he opens the door 14, leaves the seat 10 and closes the door 14 (Steps 248 to 250). Then, the process proceeds to Step 200, and the above-described processing is repeated thereafter.

Figure 11:
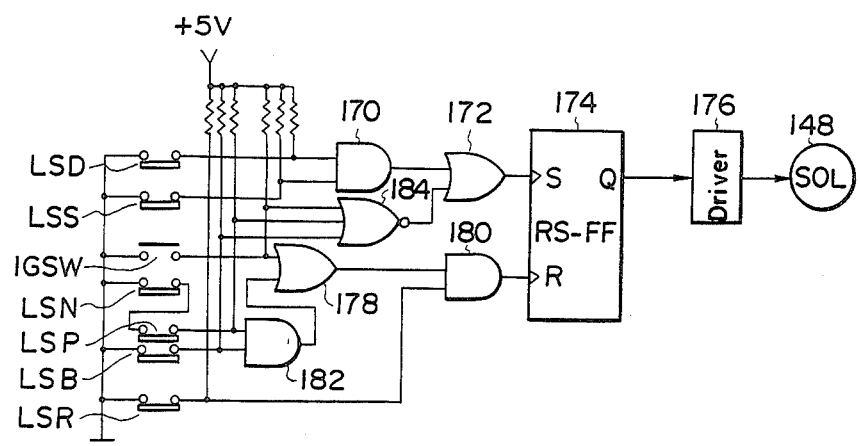
FIG. 11 shows a control circuit for the second embodiment of the present invention.

It should be noted that a microcomputer may be employed in place of the circuit shown in FIG. 11. In the case of a vehicle equipped with an automatic transmission, the hand brake switch LSB may be omitted; in the case of a vehicle with a manual transmission, the neutral position detecting switch LSN and the parking position detecting switch LSP may be omitted.

In the webbing intermediate portion retaining apparatus according to the present invention, a hanger means which is provided on the intermediate portion of a webbing is retained by a recessed retaining portion provided on a rotary member. Therefore, the rotary member need not be provided with a projection for retaining the intermediate portion of the webbing. Accordingly, there is no fear of the occupant's clothes or the like being accidentally caught by the rotary member. In addition, it is possible to widen the range within which the hanger means can be hooked on the rotary member, so that the hanger means can readily be hooked on the rotary member.

What is claimed is:

1. A webbing retaining apparatus for use in an automatic seatbelt system for a vehicle in which one end of an occupant restraining webbing is secured to a door of the vehicle so that said webbing is automatically fastened over the body of an occupant when the door of the vehicle closes, which comprises:
   (a) a hook provided on said door for retaining the intermediate portion of said webbing;
   (b) drive means for selectively moving said hook to a webbing retaining position and a webbing releasing position;
   (c) detector means for detecting when the occupant leaves and enters the vehicle, wherein said detector means includes a door switch for detecting whether said door is open or closed, a seat switch for detecting when the occupant is seated in a seat of the vehicle, an ignition switch for detecting whether an ignition device of the vehicle is on or off, and a retractor switch provided on a webbing retractor for detecting whether the webbing is unwound more than a predetermined length; and
   (d) control means for controlling said drive means in response to a signal from said detector means such that, when the occupant unwinds said predetermined length of webbing on said retractor when said ignition device is off, said hook is moved to said webbing retaining position, whereas, when the occupant opens the door of the vehicle, seats himself in said seat and closes the door said hook is moved to said webbing releasing position,
   whereby the webbing does not obstruct the occupant from entering or leaving the vehicle.

2. An apparatus according to claim 1, wherein said detector means further has a neutral position detecting switch for detecting when a transmission of the vehicle is in a neutral position, a parking position detecting switch for detecting when the transmission is in a parking position, and a hand brake switch for detecting when a hand brake of the vehicle is operative, so that, when said hand brake is operative while said transmission is in either the neutral or parking position, said control means moves said hook to said webbing retaining position through said drive means in response to signals from said neutral position detecting switch or said parking position detecting switch and said hand brake switch, wheras, when said ignition switch is ON and said hand brake is released and, further, said transmission is in any position other than the neutral and parking positions, said control means controls the drive means such that, even when said webbing is unwound more than a predetermined amount, said hook is maintained in said webbing releasing position.

3. An apparatus according to claim 1, wherein said drive means has a motor and a link mechanism driven thereby, so that said hook is allowed to perform linear motion.

4. An apparatus according to claim 1, wherein said drive mens has a rotary solenoid and a rotary shaft driven thereby, so that said hook is allowed to perform rotary motion.

5. An apparatus according to claim 1, wherein said hook is frusto-conical and has a retaining groove with a U-shaped cross-section which is circumferentially provided in the peripheral surface of said hook.

6. An apparatus according to claim 1, wherein said hook is frusto-conical and has a retaining portion formed by partially cutting the peripheral and bottom surfaces of said hook.

7. An apparatus according to claim 1, wherein said webbing retaining position is defined by a position where said hook is projected from said door, and said webbing releasing position is defined by a position where said hook is withdrawn and thereby accommodated inside said door.

8. An apparatus according to claim 1, wherein said control means is a microcomputer.

9. An apparatus according to claim 1, wherein said drive means includes a motor rotated in both forward and backward directions in response to a signal from said control means, a worm connected to the rotary shaft of said motor, a worm wheel engaged with said worm, and a link connected at one end thereof to said worm wheel at a position thereon which is offset from the center of rotation of said worm wheel, said link being connected at the other end to one end of said hook.

10. A webbing retaining apparastus for use in an automatic seatbelt system for a vehicle in which one end of an occupant restraining webbing is secured to a door of the vehicle, and the other end of said webbing is wound up into a webbing retractor, so that, when said door is closed, said webbing is automatically fastened to the body of an occupant, which comprises:
(a) a hook provided on said door and having a portion for retaining the intermediate portion of said webbing;
(b) drive means for selectively moving said hook to a webbing retaining position and a webbing releasing position;
(c) hanger means provided on the intermediate portion of said webbing such that, when said hook is at said webbing retaining position, said hanger means can be retained by the retaining portion of said hook, whereas, when said hook is at said webbing releasing position, said hanger means is disengaged from said hook by virtue of the webbing tension;
(d) detector means for detecting when the occupant leaves and enters the vehicle, wherein said detector means includes a door switch for detecting whether the vehicle door is open or closed, a seat switch for detecting when the occupant is seated in a seat of the vehicle, an ignition switch for detecting whether an ignition device of the vehicle is on or off, and a retractor switch provided in the webbing retractor for detecting whether the webbing is more than a predetermined length; and
(e) control means for controlling said drive means such that, when the occupant unwinds said predetemrined length of webbing on said retractor when said ignition device is off, said hook is moved to said webbing retaining position, whereas, after the occupant has entered the vehicle by opening the vehicle door, and has seated himself in said seat and closed the vehicle door, said hook is moved to said webbing releasing position in response to a signal from said detecting means,
whereby the webbing does not obstruct the occupant from entering or leaving the vehicle.

11. An apparatus according to claim 10, wherein said detector means further has a neutral position detecting switch for detecting when a transmission of the vehicle is in the neutral position, and a parking position detecting switch for detecting when the transmission is in the parking position, and a hand brake switch for detecting when a hand brake of the vehicle is operative, so that, when said hand brake is operative while said transmission is in either the neutral or parking position, said control means moves said hook to said webbing retaining position through said drive means in response to signals from said neutral position detecting switch or said parking position detecting switch and said hand brake switch, whereas, when said ignition switch is ON and said hand brake is released and, further, said transmission is in any position other than the neutral and parking positions, said control means controls the drive means such that, even when said webbing is unwound more than a predetermined amount, said hook is maintained in said webbing releasing position.

12. An apparatus according to claim 10, wherein said drive means has a motor and a link mechanism driven thereby, so that said hook is allowed to perform linear motion.

13. An apparatus according to claim 10, wherein said drive means has a rotary solenoid and a rotary shaft driven thereby, so that said hook is allowed to perform rotary motion.

14. An apparatus according to claim 10, wherein said hook is frusto-conical, said retaining portion being defined by a retaining groove with a U-shaped cross-section which is circumferentially provided in the peripheral surface of said hook.

15. An apparatus acoording to claim 10, wherein said hook is frusto-conical, said retaining portion being formed by partially cutting the peripheral and bottom surfaces of said hook.

16. An apparatus according to claim 10, wherein said webbing intermediate portion retaining position is defined by a position where said hook is projected from said door, and said webbing releasing position is defined by a position where said hook is withdrawn and thereby accomodated inside said door.

17. An apparatus according to claim 10, wherein said control means is a microcomputer.

18. An apparatus according to claim 10, wherein said drive means includes a motor rotated in both forward and backward directions in response to a signal from said control means, a worm connected to the rotary shaft of said motor, a worm wheel engaged with said worm, and a link connected at one end thereof to said worm wheel at a position thereon which is offset from the center of rotation of said worm wheel, said link being connected at the other end to one end of said hook.

19. A webbing retaining apparatus for use in an automatic seatbelt system for a vehicle in which one end of an occupant restraining webbing is secured to a door of the vehicle so that said webbing is automatically fastened over the body of an occupant when the door of the vehicle closes, which comprises:
(a) a hook provided on said door for retraining the intermediate portion of said webbing;
(b) drive means for selectively moving said hook to a webbing retaining and a webbing releasing position, including a motor rotatable in both forward and backward directions, a worm connected to the rotary shaft of the motor, a worm wheel engaged with said worm, and a link connected at one end thereof to said worm wheel at a position thereon which is offset from the center of rotation of the worm wheel, said link being connected at the other end to one end of the hook;
(c) detector means for detecting when the occupant leaves and enters the vehicle, whererin said detector means includes a door switch for detecting whether said door is open or closed, a seat switch for detecting when the occupant is seated in a seat of the vehicle, an ignition switch for detecting whether an igition device of the vehicle is on or off, and a retractor switch provided on a webbing retractor for detecting whether the webbing is unwound more than a predetermined length; and (d) control means for controlling said drive means in response to a signal from said detector means such that, when the occupant unwinds said predetermined length of webbing on said retractor when said ignition device is off, and hook is moved to said webbing retaining position, whereas, when the occupant opens the door of the vehicle, seats himself in said seat and closes the door, said hook is moved to said webbing releasing position, whereby the webbing does not obstruct the occupant from entering or leaving the vehicle.

20. A webbing retaining apparatus for use in an automatic seatbelt system for a vehicle in which one end of an occupant restraining webbing is secured to a door of the vehicle, and the other end of said webbing is wound up into a webbing retractor, so that, when said door is closed, said webbing is automatically fastened to the body of an occupant, which comprises:

(a) a hook provided on said door and having a portion for retaining the intermediate portion of said webbing;

(b) drive means for selectively moving said hook to a webbing retaining and a webbing releasing postion, including a motor rotatable in both forward and backward directions, a worm connected to the rotary shaft of the motor, a worm wheel engaged with said worm, and a link connected at one end thereof to said worm wheel at a position thereon which is offset from the center of rotation of the worm wheel, said link being connected at the other end to one end of the hook;

(c) hanger means provided on the intermediate portion of said webbing such that, when said hook is at said webbing retaining position, said hanger means can be retained by the retaining portion of said hook, whereas, when said hook is at said webbing releasing position, said hanger means is disengaged from said hook by virtue of the webbing tension;

(d) detector means for detecting when the occupant leaves and enters the vehicle, wherein said detector means includes a door switch for detecting whether the vehicle door is open or closed, a seat switch for detecting when the occupant is seated in a seat of the vehicle, an ignition switch for detecting whether an ignition device of the vehicle is on or off, and a retractor switch provided in the webbing retractor for detecting whether the webbing is more than a predetermined length; and (e) control means for controlling said drive means such that, when the occupant unwinds said predetermined length of webbing on said retractor when said ignition device is off, said hook is moved to said webbing retaining position, whereas, after the occupant has entered the vehicle by opening the vehicle door, and has seated himself in said seat and closed the vehicle door, said hook is moved to said webbing releasing position response to a signal from said detecting means, whereby the webbing does not obstruct the occupant from entering or leaving the vehicle.

21. A webbing retaining apparatus for use in an automatic seatbelt system for a vehicle in which one end of an occupant restraining webbing is secured to a door of the vehicle so that said webbing is automatically fastened over the body of an occupant when the door of the vehicle closes, which comprises:

(a) a hook provided on said door for retaining the intermediate portion of said webbing;

(b) drive means for selectively moving said hook to a webbing retaining position and a webbing releasing position;

(c) detector means for detecting when the occupant leaves and enters the vehicle, including a door switch for detecting when the vehicle door is opened or closed, and a seat switch for detecting when the occupant sits in or leaves a vehicle seat, and (d) control means for controlling the drive means in response to a signal from the detector means so that when the occupant unseats himself and opens and closes the vehicle door, the hook is moved to said webbing retaining position, whereas when the occupant opens the vehicle door, seats himself and closes the vehicle door, the hook is moved to the webbing releasing position, whereby th webbing does not obstruct the occupant from leaving or entering the vehicle.

22. A webbing retaining apparatus for use in an automatic seatbelt system for a vehicle in which one end of an occupant restraining webbing is secured to a door of the vehicle, and the other end of said webbing is wound up into a webbing retarctor, so that, when said door is closed, said webbing is auomatically fastened to the body of an occupant, which comprises:

(a) a hook provided on said door and having frusto-conical contour and having a portion for retaining the intermediate portion of said webbing defined by a retaining groove with a U-shaped cross-section circumferentially formed in the peripheral surface thereof;

(b) drive means for selectively rotating said hook to a position for retaining the intermediate poriton of said webbing and a position for releasing the intermediate portion of said webbing;

(c) hanger measn provided on the intermediate portion of said webbing such that, when said hook is at said webbing retaining position, said hanger means can be retained by the retaining portion of said hook, whereas, when said hook is at said webbing releasing position, the hanger means retained by said retaining portion of said hook is disengaged therefrom by virtue of the webbing tension;

(d) detector means for detecting when the occupant leaves and enters the vehicle; and (e) control means for controlling said drive means such that, when the occupant leaves the vehicle, said hook is moved to said webbing retaining position, whereas, when the occupant enters the vehicle, said hook is moved to said webbing releasing position in response to a signal from said detecting means, whereby the webbing does not obstruct the occupant from entering or leaving the vehicle.

23. A webbing retaining apparatus for use in an automatic seatbelt system for a vehicle in which one end of an occupant restraining webbing is secured to a door of the vehicle, and the other end of said webbing is wound up into a webbing retractor, so that, when said door is closed, said webbing is automatically fastened to the body of an occupant, which comprises:

(a) a hook provided on said door and having frusto-conical contour and having a portion for retaining the intermediate portion of said webbing formed by partially cutting the peripheral and bottom surface therof;

(b) drive means for selectively rotating said hook to a position for retaining the intermediate portion of said webbing and a position for releasing the intermediate portion of said webbing;
(c) hanger means provided on the intermediate portion of said webbing such that, when said hook is at said webbing retaining position, said hanger means can be retained by the retaining portion of said hook, whereas, when said hook is at said webbing releasing position, the hanger means retained by said retaining portion of said hook is disengaged therefrom by virtue of the webbing tension;
(d) detector means for detecting when the occupant leaves and enters the vehicle, and
(e) control means for controlling said drive means such that, when the occupant leaves the vehicle, said hook is moved to said webbing retaining position, whereas, when the occupant enters the vehicle, said hook is moved to said webbing releasing position in response to a signal from said detecting means, whereby the webbing is prevented from obstructing the occupant from entering or leaving the vehicle.

* * * * *